April 6, 1937.  T. W. CARRAWAY  2,076,119
COOLING UNIT
Filed July 2, 1934  2 Sheets-Sheet 2

Inventor
Thomas W. Carraway
By Jack A. Ashley
Attorney

April 6, 1937. T. W. CARRAWAY 2,076,119
COOLING UNIT
Filed July 2, 1934 2 Sheets-Sheet 1

Inventor
Thomas W. Carraway
By Jack Atchley
Attorney

Patented Apr. 6, 1937

2,076,119

UNITED STATES PATENT OFFICE 2,076,119

COOLING UNIT

Thomas W. Carraway, Dallas, Tex., assignor to Carraway Engineering Company, Inc., Dallas, Tex., a corporation of Delaware Application July 2, 1934, Serial No. 733,402

4 Claims. (Cl. 261—111)

This invention relates to new and useful improvements in cooling units.

This invention has particularly to do with units or towers for cooling or condensing fluids and involves certain improvements making for increased efficiency and economy.

An important object of the invention is to provide an improved apparatus for effecting a heat exchange by conducting the fluid to be cooled through a zone of saturated vapors generated by flowing water and air currents in such a manner as to produce these vapors and move them into direct contact with the conductor through which the said fluid is conveyed without admixing with such fluid.

A particular object of the invention is to provide an apparatus for bringing about a heat exchange through circulating through an enclosed conduit the fluid to be cooled and exposing said conduit to counterflowing heat absorbing fluids, whereby the latent heat is dissipated and the temperature of the fluid to be cooled is reduced.

Another object of the invention is to dissipate the heat of a fluid, such as a refrigerant, by passing the same through counterflowing streams of air and water, whereby saturated vapors are caused to move in a direction opposite to the travel of the fluid being cooled and the latent heat is thus dissipated.

Still another object of the invention is to provide a cooling device in which a finely atomized water spray is directed into oppositely flowing air currents for producing saturated vapors which are brought into intimate contact with a circuitous conductor conveying a fluid to be cooled, whereby the latent heat of such fluid is dissipated and the water is used to the best advantage to reduce the consumption thereof as contrasted with the ordinary type of water cooling towers.

A further object of the invention is to provide a pre-cooling step, whereby some of the latent heat is dissipated by conducting it through saturated vapors prior to carrying it through the water spray.

A construction designed to carry out the invention will be hereinafter described, together with other features of the invention.

Figure 5:
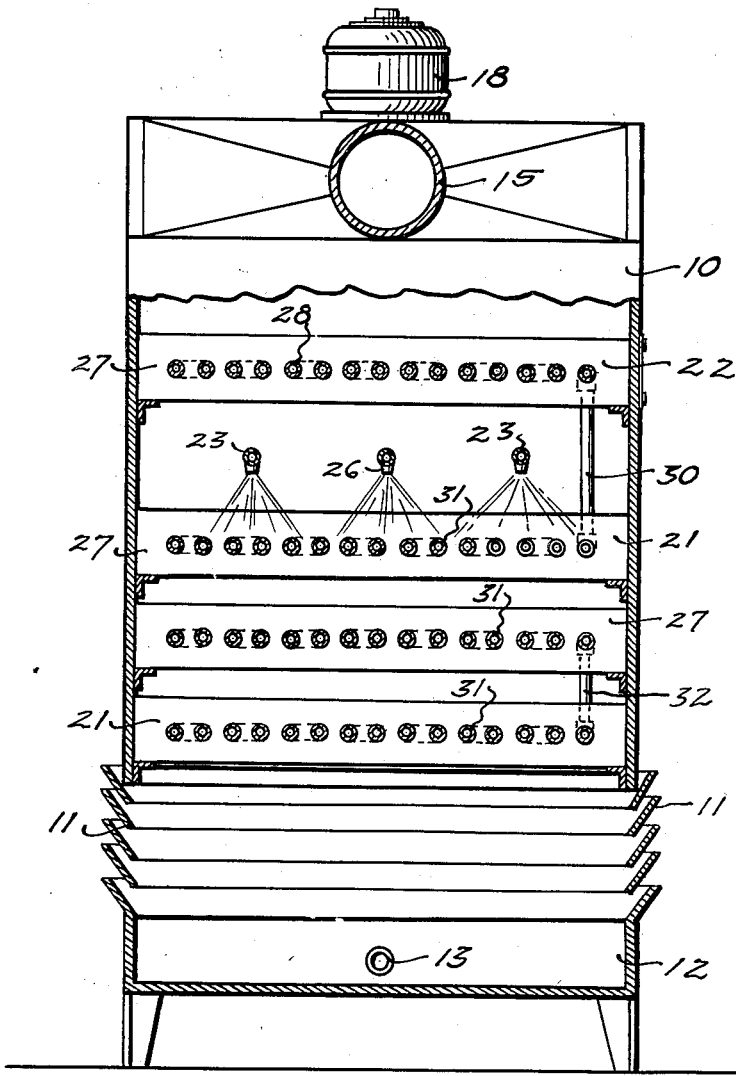
Figure 6:
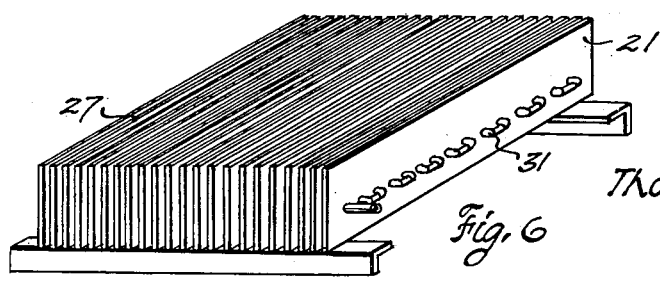
Figures 1, 2:
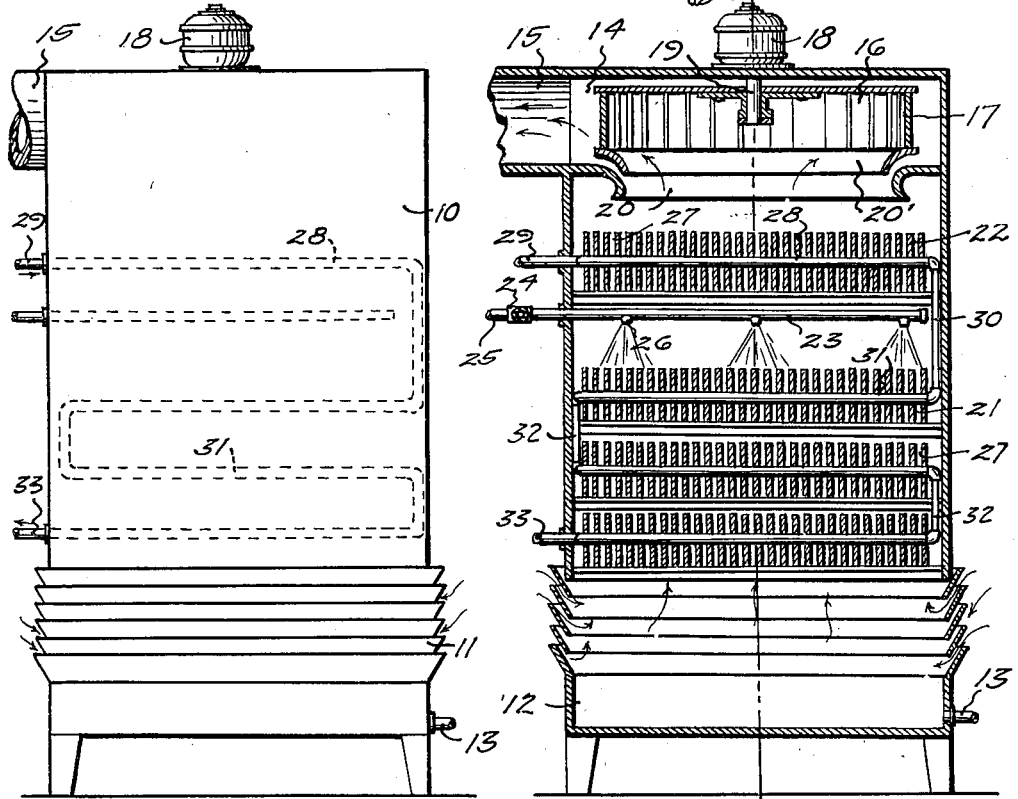
Figure 3:
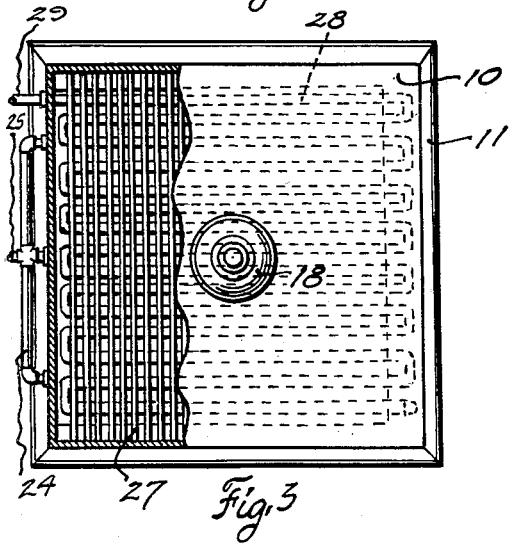
Figure 4:
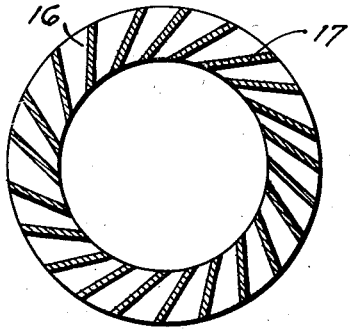

The invention will be more readily understood from a reading of the following specification and by reference to the accompanying drawings, in which an example of the invention is shown, and wherein:

Figure 1 is an elevation of a device constructed in accordance with the invention, Figure 2 is a vertical sectional view of the same, Figure 3 is a view partly in plan and partly in horizontal section, Figure 4 is a horizontal cross-sectional view of the impeller, Figure 5 is a transverse vertical sectional view taken on the line 5—5 of Figure 2, and Figure 6 is a perspective view of one of the cooling units.

In the drawings the numeral 10 designates an upright enclosed casing or tower, which is preferably rectangular in cross-section. A short distance above the bottom of the casing inclined louvres 11 are built into the side walls of the casing, so as to admit air currents to said casing. That portion of the casing lying below the louvres constitutes a pan or tray 12 for collecting the water which falls from the upper part of the casing, and such water may be periodically drawn off through a pipe 13.

A suction box 14 is formed in the upper portion of the casing and is provided with an outlet collar 15 at the side of the casing, which may be connected with an air flue or other conduit for conducting air from the box and casing. In this box I mount a horizontal air impeller 16 having tangential blades 17 at its periphery, such as is common in this type of impeller. An electric motor 18 mounted on top of the casing has its drive shaft 19 extending through the top of the impeller and fastened thereto, whereby the latter is rotated.

The impeller has an open bottom surrounded by an inlet ring 20', which is disposed concentrically in an annular collar 20 depending from the bottom of the box. When the impeller is rotated, a draft or suction is created whereby air currents are caused to enter between the louvres, as is shown in Figures 2 and 5. These air currents are drawn upwardly through the collar 20 and into the impeller and then discharged between the vanes 17 into the collar 15. It is obvious that any suction fan or air impelling device may be mounted at the top of the casing.

In the space between the louvres and the box, which space occupies the major portion of the height of the casing, I mount a plurality of superposed heat exchange units 21 and 22. The unit 22 is spaced a substantial distance above the units 21 and in this space transverse spray heads 23 are mounted. These spray heads are connected with a manifold 24, which is supplied by a service water pipe 25 from a suitable source. Each spray head has spaced nozzles 26 on its under side and these nozzles are constructed so as to discharge a finely atomized spray downwardly. It is obvious that the spray flows in a direction opposite to the flow of the air currents and the commingling of the sprays and the air currents produces a mist or saturated vapor.

The unit 22 is formed of a plurality of transversely extending metal fins 27 closely spaced in parallel relation. A horizontal pipe coil 28 extends back and forth through the fins at substantially right-angles thereto, as is best shown in Figure 3. One end of the coil is connected to an inlet pipe 29, while the opposite end of the coil is connected to a downwardly extending discharge pipe 30. The coil and the pipe 30 are preferably located within the casing.

The discharge pipe 30 extends through the space between the units and has connection with the coil 31 of the uppermost unit 21. The units 21 are substantially the same in construction as the unit 22. The units 21 are superposed and each includes the fins 27 and a coil 31, the coils of one unit 21 being connected with the coils of the next unit 21 by risers 32. The units are suitably supported in the casing and may vary in number, according to the capacity of the device. A discharge pipe 33 leads from the lowermost coil for conducting the cooled fluid, either as a liquid or a gas, from the casing.

It will be noted that in each unit the coils extend transversely so that a fluid, such as a refrigerating gas, entering the coil 28 from the pipe 29, will be circulated back and forth across the upper portion of the casing above the spray heads. The water vapors passing upwardly above the spray heads will contact the fins 27 of the coil 22 and cool the same, whereby the latent heat in said coil will be dissipated or radiated from the coil by the fins. The fluid in the coil 28 will be at its highest temperature and the heat exchange will cause the vapors to absorb the heat, whereby the latter become hot vapors and carry off such heat. This preliminary step will rob the fluid of its higher temperatures so that it will readily flow downward through the pipe 30 and will result in an increase of efficiency of the cooling unit by the further transfer of heat to the vapors above the spray heads instead of allowing them to pass out immediately at the stage where the water sprays are introduced.

The upwardly flowing air currents passing between the fins 27 of the units 21 will contact the sprays and absorb the moisture thereof to a maximum extent. There will be some condensation and some moisture which will not be absorbed by the air currents and this will be collected in the tray 12. Under certain conditions at least, depending on the temperature and humidity of the air, substantially all of the water might be absorbed. It will be obvious that the fluid gradually travelling downwardly in its circuitous transverse paths will undergo a temperature drop and its latent heat will be dissipated at each successive downward stage. Consequently the coldest vapors will be in the lower part of the casing and the air currents will likewise be at their lowest temperatures in the same area; thus, as the air currents pass upwardly their temperatures rise. There will be sufficient temperature drop in the coils to condense a hot refrigerant gas into a substantially cool liquid.

It is pointed out that satisfactory results may be had by omitting the fins and using only the coils. It would also be possible to do away with the unit 22 and the pre-cooling or heat exchanging step. The salient feature of the invention is the conducting of the fluid to be cooled through a zone of oppositely flowing heat exchanging currents or fluids. It is obvious that by absorbing the water from the sprays a much smaller amount of water is required than in the usual cooling tower and it is not necessary to recirculate the water as is commonly done.

In using the device the casing 10 is set up at a suitable location and the motor 18 is connected with a source of electrical current supply so that the impeller 16 may be operated. The collar 15 is connected with a suitable flue or outlet, but if it was desired to recirculate the air currents, this collar would discharge the air currents into the atmosphere contiguous to the casing. The pipe 29 is connected with a source of fluid supply, as the condenser of an air conditioning machine, or any other mechanism utilizing a fluid which it was desired to cool. The discharge or return pipe 33 would be connected with the same source or mechanism, unless it was desired to conduct the cooled fluids to another point. Water from a suitable source, as the ordinary building water supply, may be delivered to the pipe 25.

When the motor 18 is energized, the impeller 16 will be rapidly rotated, so that air currents will be drawn in through the louvres 11 and induced to flow upwardly between the fins 27 of the heat exchange units 21 and 22. These upwardly flowing air currents will pass through the fine sprays which are discharged downwardly from the nozzles 26 and consequently saturated vapors or mists will be produced and these vapors will be carried upwardly due to the flow of the air currents. The saturated vapors flowing above the spray heads 23 will pass between the fins of the preliminary heat exchanging unit 22. At this point the incoming fluid will be at its highest temperature and heat radiated will be rapidly absorbed by the vapors, which will reach their highest temperature at this point. By this arrangement a very efficient preliminary cooling is effected.

It is obvious that as the fluid passes downwardly through the coils, its temperature is gradually reduced and thus a gas may be condensed into a liquid. The gradual temperature drop of the fluid in its downward travel causes the air currents to rise in temperature as they ascend and to absorb increasing amounts of latent heat as they rise.

It is pointed out that the heat exchange is brought about by so flowing the water and air currents as to produce a mist or saturated vapors which are brought into intimate contact with the coils through which is flowing the liquid to be cooled. The invention, therefore, is not to be limited to a downwardly directed spray of water and upwardly flowing air currents, as it is obvious that water may be caused to fall through upwardly moving air currents without directing the spray downwardly. The invention does not depend upon the particular structure which has been illustrated, and so long as the saturated vapors are generated and passed through a zone through which the fluid to be cooled is flowing, said invention will be carried out, provided the fluid which is being cooled is not admixed with the water and air.

The description which has been given recites more or less detail of a particular embodiment of the invention, which is set forth as new and useful; however, I desire it understood that the invention is not limited to such exact details of construction, because it is manifest that changes and modifications may be made, within the scope of the appended claims, without departing from the spirit of the invention.

What I claim and desire to secure by Letters Patent, is:

1. A cooling unit comprising, a plurality of heat exchange coils for continuously conducting a fluid to be cooled, means for flowing air currents upwardly between said coils, spray heads for directing finely atomized sprays downwardly between said coils and into said upwardly flowing air currents, whereby the air currents are saturated and brought into intimate contact with the coils for dissipating the latent heat of the fluid flowing through said coils, and a preliminary heat exchange coil mounted above the spray heads in the path of the saturated vapors and connected with the other coils.

2. A cooling unit comprising an upright cabinet, a plurality of cooling unit coils disposed in the cabinet one above the other and connected together to form a continuous passage for conducting a fluid therethrough to be cooled, a plurality of closely spaced fins mounted on and surrounding each tube of said coils and arranged to provide free narrow vertical passages for air and water, whereby amplified radiating surfaces are provided, means for inducing a flow of air currents upwardly between said fins, and means at an intermediate position of the cooling unit coils for directing a spray of water downwardly between said fins into said upwardly flowing air currents, whereby the air currents are saturated and brought into intimate contact with the fins for dissipating the latent heat of the fluid through said coils.

3. A cooling unit comprising an upright enclosure having an air inlet at its bottom and an outlet at its top, means for causing a continuous upward passage of air therethrough, a plurality of connected cooling elements in said enclosure disposed one above another with an inlet to the upper element for fluid to be cooled and an outlet for the cooled fluid from the bottom cooling element so that the fluid to be cooled has a continuous downward passage through said cooling elements in a counter direction to the passage of the air passing through the enclosure, and means in an intermediate position with respect to the cooling elements for introducing a downwardly directed spray of water so as to admix with the air in its upward passage through the enclosure and form ascending saturated vapors, whereby a preliminary partial cooling of the fluid to be cooled is effected above the water spray means and a further cooling thereof is effected in the lower cooling elements.

4. A cooling unit including, a plurality of continuously connected heat exchange coils arranged one above another for conducting a fluid to be cooled, means for flowing air currents upwardly between said coils, and spray heads at an intermediate position between cooling coils for directing finely atomized sprays downwardly into said upwardly flowing air currents past a number of the coils below the heads successively and in such quantity as to be substantially absorbed by the air currents, whereby the air currents are saturated and brought into intimate contact with the coils for dissipating the latent heat and cooling the fluid flowing through said coils.

THOMAS W. CARRAWAY.